2,750,368
CHROMIUM TRIOXIDE OXIDATION OF DEHYDROABIETIC ACID DERIVATIVES

Thomas F. Sanderson, Wilmington, Del., assignor to Hercules Powder Company, Wilmington, Del., a corporation of Delaware No Drawing. Application March 25, 1955,
Serial No. 496,914

6 Claims. (Cl. 260—99)

The present invention relates to a process for the oxidation of dehydroabietic acid derivatives by means of anhydrous chromium trioxide to produce compounds oxygenated in the 7 and 9 positions.

It is known that certain derivatives of dehydroabietic acid which possess in the 1 position a radical resistant to oxidation, e. g., methyl dehydroabietate, can be oxidized by means of aqueous chromic acid to produce 9-oxo derivatives of the starting compound. In this reaction there is negligible attack at the 7 position of the dehydroabietyl nucleus.

When it was found desirable in the prior art to produce compounds that were more highly oxidized, the methods devised were relatively complex and costly. For example, in applications Serial Nos. 371,718, now U. S. 2,703,809, and 371,719, filed July 31, 1953, by P. F. Ritchie, esters of 14-hydroxy-9-oxodehydroabietic acid and 7-acetyl-1,2,3,4,4a,9,10,10a - octahydro - 1,4a - dimethyl - 9 - oxophenanthrene-1-carboxylic acid are described and claimed. However, the processes therein described for the preparation of these compounds undesirably involve a plurality of steps starting with an ester of 9-oxodehydroabietic acid.

In accordance with the present invention, it has been found that esters and other derivatives of dehydroabietic acid having a radical resistant to oxidation in the 1 position can be oxidized in a single step with anhydrous chromium trioxide to convert the carbon in the 9 position to a keto group and to effect replacement or substitution of the isopropyl group in the 7 position of the dehydroabietyl nucleus.

The process of the invention comprises oxidizing with anhydrous chromium trioxide a compound having the formula

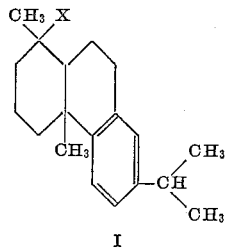

I wherein X is a radical selected from the group consisting of carboalkoxy, cyano, acyl and acyloxyalkyl radicals to form a compound having the formula

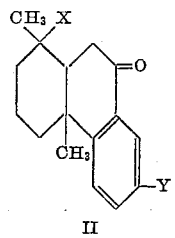

II wherein X is the same as above and Y is a radical selected from the group consisting of acetyl and 2-hydroxyisopropyl.

The following examples further illustrate the process of the invention. All parts and percentages are by weight unless otherwise specified.

Example 1

There was dissolved 5.62 parts of dehydroabietonitrile in a mixture of 52.5 parts of acetic acid and 54 parts of acetic anhydride. The resulting solution was cooled to a temperature of 20–25° C. and 9.33 parts of chromium trioxide was added gradually over a period of 6 hours. After stirring overnight at room temperature, the solution was poured into ice water and stirred for 3 hours. Upon filtration, washing and drying, there was obtained 5.61 parts of a solid precipitate.

The precipitate obtained as above was dissolved in 90 parts of benzene and passed through a column of basic alumina. Four hundred parts of methylene chloride was then passed through the column, and the combined benzene and methylene chloride effluents were evaporated to 2.6 parts of a solid material which was discarded. Continued eluting of the adsorbent with methylene chloride removed an additional 1.51 parts of material which crystallized from the methylene chloride on standing. This latter material was recrystallized twice from methanol and was found to melt at 169.5–170.5° C. *Analysis.—* Found: C, 77.59; H, 7.35. Calculated for $C_{19}H_{21}NO_2$: C, 77.26; H, 7.17. This material was thus identified as 7 - acetyl - 1,2,3,4,4a,9,10,10a - octahydro - 1,4a - dimethyl-9-oxo-1-phenanthrenecarbonitrile.

Example 2

There was dissolved 28.1 parts of dehydroabietonitrile in a mixture of 315 parts of acetic acid and 265 parts of acetic anhydride. The solution was cooled to 20° C. and 46.1 parts of solid chromium trioxide was added in small portions over a period of 8 hours with stirring while maintaining the temperature between 20–25° C. Following the last addition of chromium trioxide, the resultant dark green solution was stirred overnight at room temperature.

The next day the dark green solution was poured into a well-stirred solution of 50 parts of sodium acetate and 3000 parts of ice water. After stirring for 2 hours, a solid precipitate was obtained by decantation. The precipitate was next slurred with ether and 5.24 parts of yellow crystalline product was recovered by filtration.

The yellow crystalline material was dissolved in 30 parts of methylene chloride and passed through a tower of basic alumina. The methylene chloride was then evaporated from the effluent and there was obtained 4.9 parts of a white crystalline material melting at 168–169° C. Two recrystallizations from methanol yielded 4.10 g. of product melting at 169–170° C. This product gave no depression of melting point when admixed with the 7-acetyl derivative prepared in the manner of Example 1, thus showing it to be the same compound.

The ether solution from the first filtration step of this example was combined with the mother liquors from the crystallization steps and evaporated to dryness to yield 24.5 parts of a solid residue. This residue was dissolved in benzene and fractionated by chromatographic adsorption as follows on a column of basic alumina:

| Fraction | Solvent | Weight of Solvent (Parts) | Weight of Residue (Parts) |
|---|---|---|---|
| 1 | Benzene | 440 | } 9.27 |
| 2 | do | 440 | |
| 3 | do | 879 | 3.30 |
| 4 | $CH_2Cl_2$ | 2,670 | 5.14 |
| 5 | $CH_2Cl_2$ | 2,670 | } 3.15 |
| 6 | $CH_2Cl_2$ | 2,670 | |
| Total weight recovered | | | 20.86 |

Fractions 4, 5 and 6 were combined and recrystallized from methanol to yield 4.5 parts of crystals melting at 166° C. These also were analyzed as the 7-acetyl derivative prepared in Example 1.

*Example 3*

The procedure of Example 2 was followed in oxidizing 2810 parts of dehydroabietonitrile with proportionately larger amounts of acetic acid, acetic anhydride and chromium trioxide. A portion of the solid material recovered after drowning the reaction solution in water was dissolved in benzene and chromatographically adsorbed on basic alumina. The benzene effluent was evaporated to dryness to yield 54.2 parts of a crystalline material. An ultraviolet adsorption curve on this material indicated the absence of any diketone as prepared in Example 1. By recrystallization from methanol there was obtained 34.8 parts of a crystalline material melting at 113–115° C. *Analysis.*—Found: C, 75.17; H, 7.84; N, 3.75. Calculated for $C_{22}H_{27}NO_3$: C, 74.75; H, 7.70; N, 3.96.

The crystalline material was thus identified as 14-acetoxy-9-oxodehydroabietonitrile and was used to verify that the solid material obtained in fractions 1, 2 and 3 of Example 2 was the same compound.

*Example 4*

To 9.42 parts of methyl dehydroabietate dissolved in a mixture of 158 parts of glacial acetic acid and 119 parts of acetic anhydride there was added over a period of 7 hours 14 parts of solid chromium trioxide, the addition being made with stirring while maintaining the temperature between 20 and 25° C. Following the addition, the mixture was stirred at room temperature overnight. The following morning the reaction mixture was poured into 2000 parts of ice water containing 50 parts of sodium acetate and stirred for 2 hours. The resulting solid material was allowed to settle and the liquor decanted. The solid material was then dissolved in ether and the ether solution washed with water until neutral. Evaporation of the ether yielded 9.8 parts of crude oxidate.

The crude oxidate was dissolved in benzene and chromatographed on a 1½ inch x 48 inch column of basic alumina. The following fractions were collected in conventional manner:

| Fraction | Eluent | Weight of Material Eluted (Parts) |
|---|---|---|
| 1 | 88 parts benzene | 3.70. |
| 2 | 352 parts benzene | 0.78; low M. P. |
| 3 | 1,320 parts benzene | 1.55. |
| 4 | 5,280 parts benzene | 1.33. |
| 5 | 1,540 parts $CH_2Cl_2$—Ether (1:1) | 0.25; dark and tarry. |
| 6 | 2,393 parts methanol | 0.25; dark and tarry. |

Fraction 1 was recrystallized from methanol to give 3.08 parts of crystalline material melting at 127–129° C. This was identified as methyl-14-acetoxy-9-oxodehydroabietate by mixed melting point with an authentic specimen.

Fraction 4 was recrystallized from methanol to give 0.88 part of crystalline material melting at 143–144° C. This material was identified as the methyl ester of 7-acetyl - 1,4a - dimethyl - 9 - oxo - 1,2,3,4,4a,9,10,10a-octahydrophenanthrene-1-carboxylic acid by mixed melting point with an authentic specimen.

*Example 5*

To 37.68 parts of methyl dehydroabietate dissolved in a mixture of 630 parts of acetic acid and 490 parts of acetic anhydride there was added 56 parts of solid chromium trioxide by the procedure described in Example 4. A crude oxidate was then worked up, also following the procedure of Example 4.

The crude oxidate was next dissolved in ether and the ether solution was divided into two equal portions, A and B. Portion A was dried and upon evaporation yielded 20.03 parts of crystalline residue. Portion B was washed with a 1% aqueous sodium hydroxide solution and evaporation of the washed ether solution yielded 18.08 parts of solid residue. Chromatographic separation of the residue from portion B yielded methyl-14-acetoxy-9-oxodehydroabietate in 26.8% yield and the methyl ester of 7-acetyl-1,2,3,4,4a,9,10,10a-octahydro-1, 4a-dimethyl-9-oxophenanthrene-1-carboxylic acid in 12% yield.

*Example 6*

Following the procedure of Example 4, 62.8 parts of methyl dehydroabietate was dissolved in a mixture of 630 parts of acetic acid and 485 parts of acetic anhydride. The solution was cooled to 20° C. and 93.3 parts of solid chromium trioxide was added over a period of 7 hours with stirring. A crude oxidate in the amount of 66.6 parts was isolated as in Example 4 and this was chromatographically separated to yield methyl-14-acetoxy-9-oxodehydroabietate in 29% yield and the methyl ester of 7-acetyl-1,2,3,4,4a,9,10,10a-octahydro-1,4a-dimethyl-9-oxophenanthrene-1-carboxylic acid in 18% yield.

*Example 7*

Following the procedure of Example 4, 22 parts of dehydroabietyl benzoate was oxidized using 26.3 parts of solid chromium trioxide to produce a crude oxidate. Treatment of the crude oxidate as in Example 4 yielded 14 - acetoxy - 9 - oxodehydroabietyl benzoate and 7-acetyl - 1,2,3,4,4a,9,10,10a - octahydro - 1 - benzoxymethyl-1,4a-dimethyl-9-oxophenanthrene.

*Example 8*

The procedure of Example 4 was followed in oxidizing 9.4 parts of 1-acetyl-1,2,3,4,4a,9,10,10a-octahydro-7-isopropyl-1,4a-dimethylphenanthrene using the same relative proportions of reactants. The products isolated by chromatographic separation of the crude oxidate were 1,7 - diacetyl - 1,2,3,4,4a,9,10,10a - octahydro - 1,4a - dimethyl-9-oxophenanthrene and 1-acetyl-1,2,3,4,4a,9,10, 10a - octahydro - 7 - (1 - hydroxyisopropyl) - 1,4a-dimethyl-9-oxophenanthrene.

The 1-acetyl derivative used as the starting reactant in the example was prepared as follows:

A methyl Grignard reagent was prepared in conventional manner by the reaction of 16.12 parts of magnesium and 95 parts of methyl iodide in anhydrous ether. To the solution of methyl Grignard reagent so obtained there was added 140.5 parts of dehydroabietonitrile dissolved in approximately 1350 parts of benzene. The temperature was raised and the ether distilled off until a reflux temperature of 75–77° C. was reached. Refluxing was continued for 20 hours, the mixture was then cooled and about 550 parts of 5% hydrochloric acid was added slowly with stirring. After stirring for 30 minutes, the mixture was diluted with 1500 parts of ether and allowed to separate in two layers, an ether-benzene layer and an aqueous acid layer. The ether-benzene layer was washed thoroughly with dilute hydrochloric acid until no deepening of color was observed in the aqueous layer from the washing step. The ether-benzene layer was then discarded and the acid washes combined and heated to approximately 100° C. for 3 hours with stirring. The mixture was then cooled, extracted with ether and the ether layer washed with water, dried and evaporated. This yielded 8.41 parts of a solid ketonic residue.

Ten parts of the solid ketonic residue was dissolved in about 48 parts of absolute alcohol containing approximately 10.5 parts of acetic acid and 10 parts of Girard's reagent (trimethylaminoacethydrazide hydrochloride) and heated under reflux for 4 hours. The reaction mixture was cooled and poured into 240 parts of ice water containing 6 parts of sodium hydroxide. This aqueous mixture was extracted 6 times with 175 part portions of ethyl ether and the extracts discarded. The aqueous layer was made strongly acid by the addition of 48 parts of concentrated hydrochloric acid. After standing for 1.5 hours, the mixture was extracted with ether and the ether layer washed with water, dried and evaporated to dryness yielding 3.8 parts of solid residue. The procedure was repeated with the remaining crude ketonic residue so that a total of 26.9 parts of solid residue was obtained.

The ketonic residue was next distilled which yielded 25 parts of a colorless material boiling at 165–168° C. at 0.1 mm. pressure. This material was recrystallized from ethanol yielding 22.6 parts of white crystalline material ketone melting at 43–44° C. *Analysis.*—Calculated for $C_{21}H_{30}O$ (the 1-acetyl derivative): C, 84.51; H, 10.13. Found: C, 84.68; H, 10.33.

The majority of compounds which serve as starting reactants in accordance with the invention are known to the art and can be prepared from dehydroabietic acid by known methods. The starting compound of Example 8 is not known but its preparation is described. In addition to the reactants illustrated in the examples, there may be employed any alkyl ester of dehydroabietic acid such as the ethyl, propyl, 2-ethylhexyl, octadecyl, etc. esters. Similarly, the starting reactant can be any acyl derivative of dehydroabietic acid, e. g., compounds in which the carboxy group of dehydroabietic acid has been replaced by a propionyl, lauroyl, stearoyl or a like radical. Other useful starting compounds are the acid esters of dehydroabietyl alcohol, e. g., acetic, benzoic, propionic and other monobasic acid esters of this alcohol. In so far as concerns the process of the invention, the characteristics of the radical in the 1 position are immaterial since this radical does not take part in the oxidation reaction.

In accordance with the invention, a compound of Formula I is oxidized by heating a mixture of the reactant, chromium trioxide and acetic anhydride. The function of the latter compound is to combine with the water produced during the reaction and thus maintain an anhydrous condition. It is, therefore, used in an amount which is at least stoichiometrically sufficient to combine with the liberated water but an excess can be used without detriment. It has been found that maintaining an anhydrous system promotes the desired attack on the isopropyl group of the starting compound without interfering with the oxidative attack at the 9 position.

The acetic anhydride will itself serve as an inert reaction medium, but it is helpful to use additionally an inert, nonaqueous solvent for the reactants in order to minimize precipitation of chromium salts. Exemplary of the solvents which may be used are the carboxylic acids, such as acetic acid, propionic acid, dichloreacetic acid, etc.; alcohols, such as tertbutyl alcohol, etc. Of particular value is an acid such as acetic acid because it is an excellent solvent for the starting reactant and also dissolves chromium trioxide. The amount of solvent used in carrying out the reaction is immaterial but should be such an amount that the reacting solution is easily agitated. In general, the amount of solvent which is used is the amount which will result in a 5–25% solution of the starting reactant. A more concentrated solution of the reactant may be used but is difficult to handle. In the same way, larger amounts of solvent may be used but are not generally employed because of the bulk of the reaction mixture which must then be handled.

The amount of chromium trioxide which is used in accordance with the invention can be varied depending upon the degree of oxidation desired but, in general, is an amount ranging from about 1 mole to about 5 moles per mole of the starting reactant. In the preceding examples, the amount of chromium trioxide used was equal to approximately 4.5 moles per mole of reactant.

In general, the oxidation is carried out at a temperature of from about 20° C. to 60° C. and preferably from about 25° C. to about 35° C.

As illustrated in the examples, the oxidation step leads to a mixture of oxygenated products including primarily the 14-acetoxy-9-oxo and 7-acetyl-9-oxo compounds. These two primary products can be separated, also as illustrated in the examples, by chromatographic adsorption using one or more solvents. In addition to benzene and methylene chloride, other solvents such as petroleum ether, heptane, isooctane, diethyl ether, cyclohexane, methylcyclohexane, p-menthane and dipentene are suitable.

What I claim and desire to protect by Letters Patent is:

1. The process which comprises oxidizing a compound having the formula

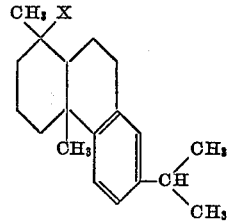

wherein X is a radical selected from the group consisting of carboalkoxy, cyano, alkanoyl, alkanoyloxyalkyl, and benzoyloxyalkyl radicals by contacting said compound with chromium trioxide under anhydrous conditions to produce a compound having the formula

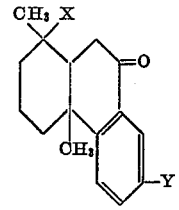

wherein X is the same as above and Y is a radical selected from the group consisting of acetyl and 2-hydroxyisopropyl.

2. The process of claim 1 in which the starting compound is dehydroabietonitrile.

3. The process of claim 1 in which the starting compound is methyl dehydroabietate.

4. The process of claim 1 in which the starting compound is dehydroabietyl benzoate.

5. The process of claim 1 in which the starting compound is 1 - acetyl - 1,2,3,4,4a,9,10,10a - octahydro - 7 - isopropyl - 1, 4a-dimethylphenanthrene.

6. The process of claim 1 in which the oxidation is carried out by contacting the starting compound with chromium trioxide in the presence of acetic anhydride at a temperature of from about 20° C. to 60° C.

References Cited in the file of this patent

UNITED STATES PATENTS

| | | |
|---|---|---|
| 2,434,643 | Drake | Jan. 20, 1948 |
| 2,656,343 | Ritchie | Oct. 20, 1953 |
| 2,656,344 | Ritchie | Oct. 20, 1953 |
| 2,656,345 | Jacobsen | Oct. 20, 1953 |
| 2,703,809 | Ritchie | Mar. 8, 1955 |